United States Patent [19]

Nakamura et al.

[11] 3,911,244

[45] Oct. 7, 1975

[54] ELECTRODE COMPOSITION AND WELDING METHOD FOR ARC WELDING STEEL

[75] Inventors: Hajime Nakamura, Tokyo; Ichiro Ohta, Yokohama, both of Japan

[73] Assignee: Ishikawajima-Harima Jukogyo Kabushiki Kaisha, Tokyo, Japan

[22] Filed: Apr. 18, 1974

[21] Appl. No.: 462,170

Related U.S. Application Data

[63] Continuation-in-part of Ser. No. 270,427, July 10, 1972, abandoned, which is a continuation-in-part of Ser. No. 55,794, July 17, 1970, abandoned.

[30] Foreign Application Priority Data

Sept. 13, 1969   Japan.................. 44-73024

[52] U.S. Cl.................... 219/146; 219/73
[51] Int. Cl.².............. B23K 35/24; B23K 35/362
[58] Field of Search.......... 148/24, 26; 219/73, 145, 219/146, 137

[56] References Cited
UNITED STATES PATENTS

| | | | |
|---|---|---|---|
| 2,909,778 | 10/1959 | Landis et al. | 219/146 |
| 3,424,892 | 1/1969 | Wilcox | 219/146 X |
| 3,560,702 | 2/1971 | Arikawa et al. | 219/146 |
| 3,767,891 | 10/1973 | Haverstraw et al. | 219/146 |
| 3,868,487 | 2/1975 | Ito et al. | 219/146 X |

*Primary Examiner*—J. V. Truhe
*Assistant Examiner*—N. D. Herkamp
*Attorney, Agent, or Firm*—Nolte and Nolte

[57] ABSTRACT

A wire electrode for use in arc welding comprising a metal to be deposited on a substrate and further comprising a flux, said flux comprising:

1. A magnesium-aluminum alloy having an aluminum content of 20 to 80 percent, said alloy present in said flux in the amount of 5 to 35 percent by weight;

2. Calcium fluoride present in said flux in the amount of 30 to 80 percent based on the weight of said flux;

3. Hematite present in said flux in an amount of 3 to 30 percent by weight;

4. Silica and/or manganese in an amount less than 10 percent based on the weight of said flux;

5. Titanium in an amount less than 1.00 percent, based upon the weight of said flux;

6. Zirconium present in said flux from 0.005 to 0.200 weight percent, based on the weight of said flux; and 7. Boron in an amount less than 0.060 weight percent, based upon the weight of said flux.

3 Claims, No Drawings

ELECTRODE COMPOSITION AND WELDING METHOD FOR ARC WELDING STEEL

CROSS REFERENCES TO RELATED APPLICATIONS

This is a continuation-in-part of application Ser. No. 270,427 of July 10, 1972 which, in turn, is a continuation-in-part of application Ser. No. 55,794, filed July 17, 1970, both now abandoned.

BACKGROUND AND NATURE OF THE INVENTION

Many attempts have been made to make welding more efficient, and particularly, to arc weld thick steel plates with high heat input. However, the welding procedures using such heat input generally formed large and coarse crystal grains in the weld metal, with corresponding loss of ductility.

Flux, usually of a type producing nitrogen gas, is normally needed for control over oxidation and for other purposes, known to persons skilled in the art. The flux can be provided as a core or sheath or powder, in or on or around the electrode rod or wire, thus providing a "composite welding electrode." In particular, it is widely preferred, including in this invention, to use a "flux cored electrode," which simplifies the operation, reduces adverse effects of wind, and allows welding in substantially any position. However, heretofore fluxes at the same time introduced difficulties of their own. Many of them made the welded metal exceedingly coarse. They also caused the generation, under welding conditions, of large amounts of gas, particularly nitrogen, which entered into weld metals and caused blow holes. These, in turn, reduced the ductility of the welded metal.

It was possible to some extent to control this drawback by adding aluminum to the electrode and thereby converting nitrogen to aluminum nitrite. However, the aluminum itself caused coarseness of the weld structure, and resulted in low ductility, particularly when the aluminum was introduced into the weld metal in excess of 0.75 percent.

It is well known that ductility of the weld metal can be improved by adding nickel. However, this metal is too expensive for many typical applications.

Yet, other constituents have been used. They include magnesium, silicon and carbon. While each supplier of electrode rods or wires generally had some preference of his own, it has become usual to provide, in addition to the steel, such dosages as: from 0.24 down to about 0.14 percent silicon, and around 0.75 or up to about 0.89 percent magnesium. The resulting ductility, in terms of notch toughness or V-notch Charpy impact value, ranged only from a vEo impact value of 1.5 to 3.5 kg.m, for single-pass welded metal. It ranged up to about 4.4 kg.m for multiple-pass welded metal. These values were obtained with welding wires of 3.2 mm diameter, at 0°C.

Attempts have also been made to improve weld metal by still other admixtures, such as columbium or molybdenum. These have produced remarkably fine grain structure, but have not usually, in the end, improved the ductility of the welded metal. Since columbium, molybdenum and the like also are very expensive, it has appeared that, in general, the art must accept a compromise between ductility of the product and expense for the same, namely, products which were based on the conventional admixtures of aluminum, magnesium and silicon, with or without nickel.

Some recent attempts have been based on addition of titanium, an ingredient known to have deoxidizing and denitrodizing properties and to produce fine grain structure and high ductility. However, the titanium then was required in such amounts as 0.15 to 0.25 percent which badly interfered with weldability, added to the problems of separation and removal of slag, and also added to the cost. Attempts have also been made involving the addition of zirconium, usually combined with titanium. Thusfar, when such ingredients were added in the required, relatively large, amounts, the resulting V-notch Charpy impact value was good, but only when the welding was done with low heat input. This, as indicated, is fundamentally undesirable in many cases. Thus, even the most advanced dosages of admixtures to arc welding electrodes have failed, thusfar, to really achieve the desired results.

SUMMARY OF THE INVENTION

In accordance with the present invention, it has now been discovered that excellent V-notch impact values can be obtained in welds wherein the wire electrode utilized contains a flux free of nickel. Specifically, it has been found that the quantity of zirconium and titanium can be markedly reduced without impairing the weld and, in fact, improving the same by utilizing a wire electrode having a metal to be deposited on the substrate which wire electrode contains a flux, said flux comprising:

1. A magnesium-aluminum alloy having an aluminum content of 20 to 80 percent, the alloy being present in the flux in an amount of 5–35 percent by weight;
2. Calcium fluoride, present in the flux in an amount of 30 to 80 percent, based upon the weight of the flux;
3. Hematite present in the flux in an amount of 3 to 30 percent by weight;
4. Silica and/or manganese in an amount less than 10 percent, based upon the weight of the flux;
5. Titanium in an amount less than 1.00 weight percent, based upon the weight of the flux;
6. Zirconium present in the flux in an amount of 0.005 to 0.200 percent, based upon the weight of the flux; and
7. Boron in an amount less than 0.060 percent by weight, based upon the weight of the flux.

The present invention is an improvement over the flux composition described in Japanese Pat. No. 29366/1970. Therein there is described an improved flux for a wire electrode having a magnesium-aluminum alloy, calcium fluoride, hematite, silica and/or manganese and nickel. As indicated above, it has been recognized in the art that the improved ductility of the weld metal was provided by the inclusion of the nickel in the flux. It has now been discovered that this nickel can be entirely eliminated from the flux composition without any substantial impairment of the ductility properties if the flux is improved by inclusion of titanium and/or zirconium and boron in the amounts specified.

In a particularly desirable embodiment of the invention, the titanium is present in an amount of from 0.025 to 1.00 percent by weight, based upon the weight of the flux. Generally speaking, the titanium is present in an amount between 0.010 and 0.100 percent based upon the weight of the electrode, i.e., the flux plus the metal to be deposited on the substrate. The zirconium is present in an amount between 0.002 and 0.020 weight percent, based upon the weight of the electrode. Preferably, the zirconium is present in the amount between 0.005 and 0.200 percent based upon the weight of said flux.

The boron is present in an amount up to but less than 0.006 percent weight percent based upon the weight of the electrode. Typically, the boron is present in an amount between 0.003 and 0.060 percent by weight, based upon the weight of the flux.

DESCRIPTION OF SPECIFIC EMBODIMENT

Steel plates of 28 mm thickness were welded together. Butt welding was performed with a 50°V-groove, by a single pass at 400 amperes, using first (1) a prior art electrode, without titanium, zirconium and boron and then (2–4) separately using electrodes according to the invention. In all cases, notch impact values determined according to well-known standard procedures, indicated a notch toughness about twice to three times as high as in prior art welding under otherwise equivalent conditions. The prior art electrode (1) was composed of a steel wire and a flux. The flux had the following composition:

| | |
|---|---|
| Mg-Al alloy of 60% Al | 20 %, by weight |
| Hematite | 4 %, by weight |
| CaF₂ | 65 %, by weight |
| Combined Si and Mn | 5 %, by weight |
| Nickel | 6 %, by weight |

The flux amounted to 25 percent of the weight of the electrode.

Similarly, the wire electrodes of the invention which included titanium, zirconium and boron had a flux composition as follows:

| Ingredients | Electrode 2 | Electrode 3 | Electrode 4 |
|---|---|---|---|
| Mg-Al Alloy (Al contents 60%) | 22 | 22 | 22 |
| CaF₂ | 67 | 67 | 67 |
| Hematite | 6 | 6 | 6 |
| Si and/or Mn | 5 | 5 | 5 |
| Titanium | 0.060 | 0.120 | 0.180 |
| Zirconium | 0.015 | 0.030 | 0.045 |
| Boron | 0.003 | 0.006 | 0.010 |

Similar tests were conducted with higher heat input at 600 amperes and wherein electrode alloys of higher grade were used. These alloys included a significant amount of nickel and produced still greater toughness. The four specimens shown here generally correspond to the four electrodes of the above described tests with the exception that in addition to inclusion of almost 1% nickel, a higher amount of titanium was utilized. The titanium content was increased to an amount up to about 0.04 percent. The compositions of the test specimens utilized in the test are as follows:

| Test Specimen | Percentages based on weight of flux | | | |
|---|---|---|---|---|
| | 1 | 2 | 3 | 4 |
| Mg-Al (Al content 60%) | 21 | 21 | 21 | 21 |
| Nickel | 3 | 3 | 3 | 3 |
| CaF₂ | 66 | 65.7 | 65.5 | 65.2 |
| Hematite | 5 | 5 | 5 | 5 |
| Si and/or Mn | 5 | 5 | 5 | 5 |
| Ti | — | 0.200 | 0.400 | 0.600 |
| Zr | — | 0.050 | 0.100 | 0.150 |
| B | — | 0.010 | 0.020 | 0.030 |

The welds which resulted by use of steel wire electrodes having the flux compositions above provided welded metals having the following compositions:

| Test Specimen | (1) | (2) | (3) | (4) |
|---|---|---|---|---|
| % Al. Sol. | 0.63 | 0.67 | 0.69 | 0.70 |
| % Ni | 0.93 | 0.87 | 0.85 | 0.89 |
| % N | 0.033 | 0.032 | 0.031 | 0.033 |
| % Si | 0.08 | 0.07 | 0.09 | 0.07 |
| % Mn | 0.85 | 0.88 | 0.87 | 0.87 |
| % C | 0.10 | 0.10 | 0.09 | 0.10 | by weight of welded metal.

In keeping with the conventional mixtures shown by this table, and also in keeping with modification of welding heat input and other conditions, it becomes necessary to modify the dosages of the new, combined admixtures titanium, zirconium and boron for best results to obtain the desired ductility and grain characteristics. However, the latter modifications must remain within the indicated values or limits, if adequate results are to be obtained. Addition of more than 0.200 percent by weight zirconium, based upon the weight of the flux, tends to produce more zirconium nitride and oxide so that the notch toughness is lower. On the other hand, addition of less than 0.005 percent by weight of zirconium, based upon the weight of the flux, would not bring about any improvement in the ductility. The addition of more than 1.00 percent by weight titanium will cause a decrease in the ductility. It has been found that when the boron is employed in an amount in excess of 0.060 percent adverse affects are obtained.

Generally speaking, the ratio of the total weight of the metal wire to the total weight of the flux is between 10 to 40 percent, preferably between 20 and 30 percent.

We have found that, without any use of nickel, the addition of titanium and/or zirconium, combined with boron, yields excellent results, but when small amounts of nickel are added to this dosage, incomparably higher values of notch toughness are attained, even when welding is performed with high heat input. For example, the results obtained employing a current of 600 amperes are as set forth in the Table below for a singlepass weld seam. The quantities of metals are on the basis of the amount found in the resultant weld metal. The 0.040 weight percent titanium in the weld metal corresponds to 0.600 percent titanium in the flux. The 0.006 weight percent zirconium in the weld metal corresponds to 0.150 percent of zirconium in the flux. The 0.002 percent boron corresponds to about 0.030 percent weight percent of boron in the flux.

| Ti | Zr | B | Ni | vEo (kg.m) | | | |
|---|---|---|---|---|---|---|---|
| | | | | measured values | | | Averages |
| 0 | 0 | 0 | 0.85 | 3.0 | 3.3 | 4.0 | 3.4 |
| — | — | — | 0 | 5.5 | 5.9 | 6.2 | 5.9 |
| 0.040% | 0.006% | 0.002% | 0.35 | 7.0 | 7.0 | 7.5 | 7.2 |
| | | | 0.85 | 9.1 | 9.4 | 9.5 | 9.3 |

| Elements in Electrode*, in % | | | | Elements in welded metal, in % | | | | | Blowholes |
|---|---|---|---|---|---|---|---|---|---|
| Al | Ti | Zr | B | N | Al sol. | Ti | Zr | B | |
| 2.35 | — | — | — | 0.032 | 1.01 | — | — | — | None |
| 2.15 | — | — | — | 0.035 | 0.82 | — | — | — | — |
| 1.95 | | 0.005 | | 0.030 | 0.63 | 0.038 | 0.004 | | |
| 1.65 | about 0.075 | to 0.020 | 0.003 | 0.038 | 0.45 | 0.040 | 0.004 | 0.002 | None |
| 1.50 | | | | 0.037 | 0.37 | 0.035 | 0.003 | | |

The flux contained 67% CaF$_2$, 6% hematite, and 5% combined manganese and silicon.

From the data in the Table above, it is seen that the notch impact strength is appreciably improved by inclusion in the flux composition of minor amounts of zirconium, titanium and boron. Note that the average values are significantly better than the values obtained using a similar prior art electrode containing nickel but free of titanium, zirconium and boron. Note furthermore that these average values are higher even when the electrode containing the titanium, zirconium and boron in the flux is free of nickel. Even higher impact values are obtained when the electrode also contains amounts of nickel providing up to 0.85 weight percent nickel in the weld metal. Such corresponds to a nickel concentration in the flux of 5 percent.

It has been suprisingly found that, contrary to expectations, it is not necessary to adjust the aluminum level to compensate for generated nitrogen. However, it has been found, that along with the new boron-zirconium-titanium dosage, the weld composition permits more than the usual addition of aluminum, thereby providing more than the usual compensation for nitrogen, without ill-effects as to the grain structure. The general improvement in ductility value is substantially retained without major change, upon modifications of the dosage of aluminum. However, optimum results are obtained with 1.4 to 2.5 weight percent aluminum, along with a nitrogen-generating flux core.

The prior art additions of molybdenum or columbium are not needed in the flux of the present invention, nor does the flux of the present invention require titanium in large amounts in combination with zirconium and boron. Previously, large quantities of titanium were necessary.

Finally, in order to determine the relative amounts of ingredients in the weld metal produced various electrodes, the weld metals were analyzed. In the following Table, there is summarized the affect of different dosages of aluminum on a weld produced from a flux core electrode of 3.2 mm diameter. A single pass was employed to produce the weld seam in steel plates of the type employed in the construction industry.

As shown in this Table, in order to secure the proper dosage in the weld metal, higher dosages are needed in the electrode, since relatively large portions of the addenda are evaporated, mixed with the nitrogen atmosphere, or lost by other means.

There is set forth below a Table which compares the impact strength of various welds obtained by forming multi-layered welds. The purpose of this Table is to demonstrate that excellent multi-layered welds are obtained by the use of electrodes including fluxes of the present invention when the flux is free of nickel. The data also demonstrates that inclusion of nickel in such a flux, which contains titanium, zirconium and boron, improves the impact strength.

(MULTI-LAYER WELDED METALS)

| | Ni% in Wire | Ni% in Weld Metal | vEo(kg.m) | | | |
|---|---|---|---|---|---|---|
| | | | measured values | | | average |
| Conventional | 1.70 | 1.5 | 5.8 | 5.9 | 7.9 | 6.4 |
| Present | 0 | 0 | 7.9 | 8.2 | 10.1 | 8.7 |
| Invention* | 0.75 | 0.6 | 7.3 | 7.9 | 8.6 | 8.0 |
| | 1.70 | 1.5 | 8.7 | 9.5 | 10.4 | 9.5 |

*Ti=0.060%, Zr=0.009%, and B=0.003%.
Welding current: 600A
The quantities of added alloy elements in the electrode wires are given as percentage based on the total weight of the wire.

In the Table above, the "conventional" electrode was a steel electrode containing a flux which flux contained 18 percent aluminum-magnesium alloy of 65 percent aluminum, 60 percent calcium fluoride, 3 percent hematite, 4 percent combined silicon and manganese, in addition to the nickel which was present in the flux in an amount of 15 percent. The flux accounted for 23 percent of the weight of the electrode.

The electrode of the "present" invention as reported in that Table contained 23 percent by weight flux. The flux contained 18 percent by weight magnesium-aluminum alloy of 65 percent aluminum content, 60 percent calcium fluoride, 3 percent hematite, 4 percent combined manganese and silcon, 0.60 percent titanium, 0.10 percent zirconium and 0.03 percent boron. The 0.75 weight percent nickel in the wire corresponds to a 6.5 percent by weight nickel content in the flux while the value 1.70 weight percent nickel in the wire corresponds to a value of 15 percent by weight nickel in the flux.

The data in the Table demonstrates that the improved impact strengths are obtained in the case of multi-layered welded metals. Note that by inclusion of titanium, zirconium and boron in the flux composition free of nickel, improved impact strength is provided over an electrode the flux of which contains nickel. The inclusion of the same amount of nickel in a flux of a wire electrode of the present invention improves the impact strength in excess of 40 percent.

Typical composite flux core electrode wires for use in self-shielded arc welding are those which include, in addition to the basic quantities of magnesium-aluminum alloy, calcium fluoride, hematite, manganese and/or silicon, the amounts of zirconium, titanium and boron in accordance with the following Table.

PERCENTAGES REPORTED BASED ON WEIGHT OF FLUX

| Titanium Content | Zirconium Content | Boron Content |
|---|---|---|
| 1. 0.330% | 0.055% | 0.014% |
| 2. 0.550% | 0.088% | 0.022% |
| 3. 0.770% | 0.121% | 0.031% |

The electrodes the fluxes of which contain the above elements in the above stated amounts contain the elements in the following amounts.

PERCENTAGES REPORTED BASED ON WEIGHT OF ELECTRODE (WIRE INCLUDING FLUX)

| Titanium Content | Zirconium Content | Boron Content |
|---|---|---|
| 0.030% | 0.005% | 0.001% |
| 0.050% | 0.008% | 0.002% |
| 0.070% | 0.011% | 0.003% |

Although preferred embodiments of the invention have been illustrated and described, many modifications thereof will be obvious to those skilled in the art. Accordingly, the invention should not be limited except as defined in the following claims.

What is claimed is:

1. A wire electrode for use in arc welding comprising a metal to be deposited on a substrate and further comprising a flux, said flux comprising:

1. Magnesium-aluminum alloy having aluminum content of 20 to 80 percent, said alloy present in said flux in the amount of 5 to 35 percent by weight;
   2. $CaF_2$ present in said flux in an amount of 30 to 80 percent, based upon the weight of said flux;
   3. Hematite present in said flux in an amount of 3 to 30 percent by weight;
   4. Silicon and/or manganese in a combined amount less than 10 percent by weight, based upon the weight of said flux;
   5. Titanium in the amount of less than 1.00 weight percent, based upon the weight of said flux;
   6. Zirconium present in said flux in an amount of 0.005 to 0.200 percent, based on the weight of said flux; and
   7. Boron in an amount less than 0.060 percent by weight, based upon the weight of said flux, said flux being from 10 to 40 percent by weight of the weight of said wire electrode.

2. An electrode according to claim 1 wherein the flux contains 5 to 15 weight percent nickel, based upon the total weight of the flux.

3. An electrode according to claim 2 wherein the metal is steel and the metal ensheathes a core of said flux.

* * * * *